(12) United States Patent
Burdett, Jr. et al.

(10) Patent No.: US 7,738,630 B2
(45) Date of Patent: Jun. 15, 2010

(54) HIGHLY ALIGNED X-RAY OPTIC AND SOURCE ASSEMBLY FOR PRECISION X-RAY ANALYSIS APPLICATIONS

(75) Inventors: John H. Burdett, Jr., Scotia, NY (US); Adam Bailey, Albany, NY (US); Zewu Chen, Schenectady, NY (US); R. Scott Semken, East Greenbush, NY (US); Kai Xin, Wynantskill, NY (US)

(73) Assignee: X-Ray Optical Systems, Inc., East Greenbush, NY (US)

( * ) Notice: Subject to any disclaimer, the term of this patent is extended or adjusted under 35 U.S.C. 154(b) by 0 days.

(21) Appl. No.: 12/397,504

(22) Filed: Mar. 4, 2009

(65) Prior Publication Data
US 2009/0225948 A1    Sep. 10, 2009

Related U.S. Application Data

(60) Provisional application No. 61/033,899, filed on Mar. 5, 2008, provisional application No. 61/039,220, filed on Mar. 25, 2008.

(51) Int. Cl.
*G21K 1/06*   (2006.01)
(52) U.S. Cl. .......................... 378/85; 378/84
(58) Field of Classification Search ............ 378/70, 378/82–85, 205
See application file for complete search history.

(56) References Cited

U.S. PATENT DOCUMENTS

| | | | | |
|---|---|---|---|---|
| 5,177,774 A | * | 1/1993 | Suckewer et al. | 378/43 |
| 5,192,869 A | * | 3/1993 | Kumakhov | 250/505.1 |
| 7,542,548 B2 | * | 6/2009 | Matsuo et al. | 378/84 |

* cited by examiner

*Primary Examiner*—Irakli Kiknadze
(74) *Attorney, Agent, or Firm*—Jeffrey Klembczyk, Esq.; Kevin P. Radigan, Esq.; Heslin Rothenberg Farley & Mesiti P.C.

(57) ABSTRACT

An x-ray analysis apparatus for illuminating a sample spot with an x-ray beam. An x-ray tube is provided having a source spot from which a diverging x-ray beam is produced, the source spot requiring alignment along a transmission axis passing through the sample spot. A first housing section is provided, to which the x-ray tube is attached, including mounting features for adjustably mounting the x-ray tube therein such that the source spot coincides with the transmission axis. A second housing section includes a second axis coinciding with the transmission axis; and at least one x-ray optic attached to the second housing section for receiving the diverging x-ray beam and directing the beam toward the sample spot. Complimentary mating surfaces may be provided to align the first and second sections, and the optics, to the transmission axis. A third housing section may also be provided, including an aperture through which the x-ray beam passes, and to which a detector may be attached.

23 Claims, 7 Drawing Sheets

//HIGHLY ALIGNED X-RAY OPTIC AND SOURCE ASSEMBLY FOR PRECISION X-RAY ANALYSIS APPLICATIONS

CROSS-REFERENCE TO RELATED APPLICATIONS

This application claims the benefit of U.S. provisional patent application Ser. No. 61/033,899, filed Mar. 5, 2008, and of U.S. provisional patent application Ser. No. 61/039,220, filed Mar. 25, 2008, each of which is hereby incorporated herein by reference in its entirety.

TECHNICAL FIELD

The present invention relates generally to x-ray analysis systems, and more particularly, to x-ray source assemblies having a focused or collimated x-ray beam output(s) with enhanced alignment and manufacturability.

BACKGROUND OF THE INVENTION

Small, compact x-ray tubes have experienced widespread adoption in x-ray fluorescence (XRF) spectroscopy and x-ray diffraction (XRD) instruments, for a wide range of industrial and other applications. X-ray tubes conventionally emit radiation in a divergent manner. In the past, obtaining an illumination spot size of sufficient intensity on a small sample area typically necessitated increasing the power supplied to expensive, high-powered tubes or other sources. The ability to focus x-ray radiation to smaller spots with higher intensities, using focusing x-ray optics, has enabled reductions in the size and cost of x-ray tubes, and x-ray systems have therefore been proliferating beyond the laboratory to in-situ, field uses. U.S. Pat. Nos. 6,934,359 and 7,072,439, incorporated by reference herein in their entirety and assigned to X-Ray Optical Systems, Inc., the assignee of the present invention, disclose monochromatic wavelength dispersive x-ray fluorescence (MWD XRF) techniques and systems, using doubly curved crystal optics in the excitation and/or detection paths. The x-ray optic-enabled systems described in these patents have enjoyed widespread success beyond the laboratory, for measuring sulfur in petroleum fuels in a variety of refinery, terminal, and pipeline environments.

Figure 1A:
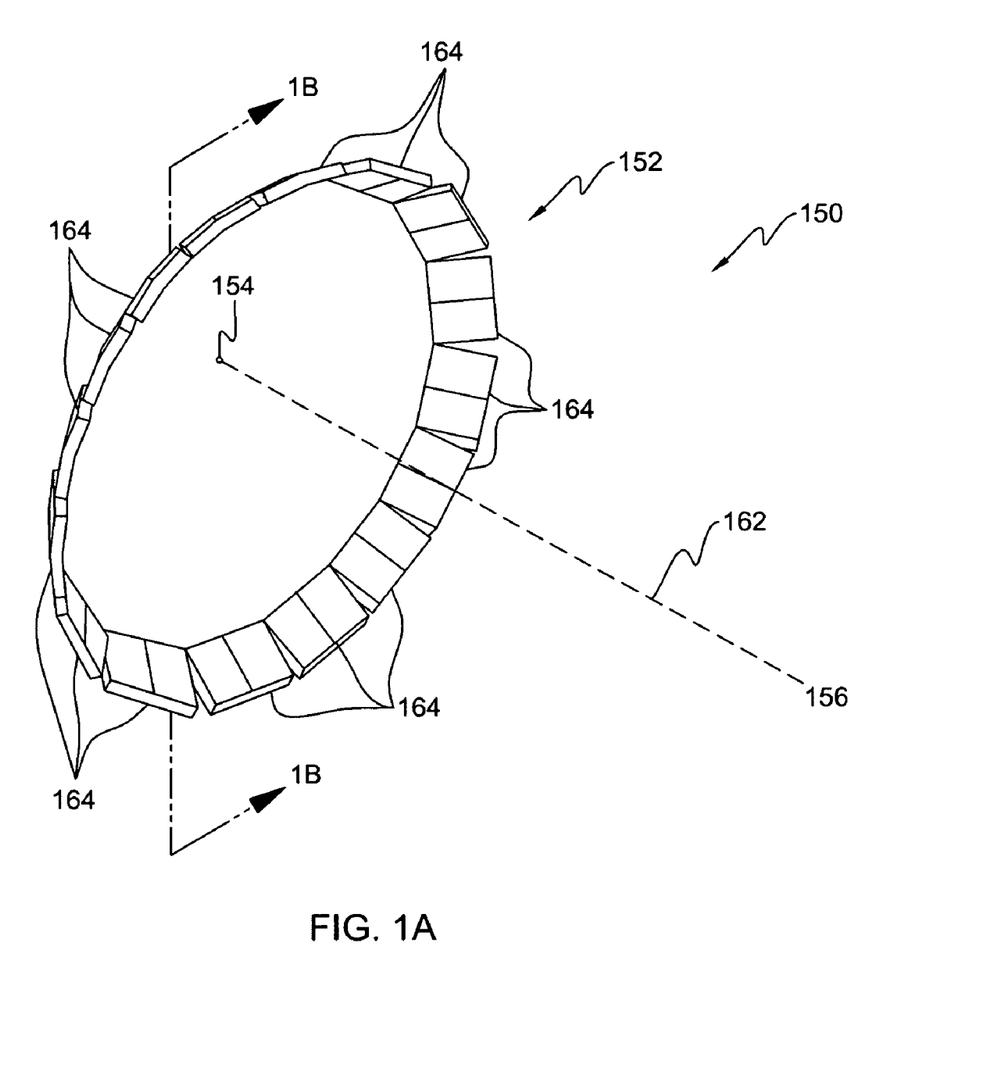
FIGS. 1a-b depict an exemplary arrangement of crystal x-ray optics about an axis, requiring alignment.

In such systems, precise optic alignment along an axis defined by a source and sample spot may be required, as illustrated in commonly-assigned U.S. Pat. No. 7,035,374, incorporated by reference in its entirety, which proposes an arrangement of curved, monochromating optics around a central axis operating according to Bragg diffraction conditions. FIG. 1a is a representative isometric view of this x-ray optic arrangement 150 having a curved optic 152, an x-ray source location 154, and an x-ray target location 156. X-ray source location 154 and x-ray target location 156 define a source-to-target transmission axis 162. Optic 152 may include a plurality of individual optic crystals 164, all of which are generally required to be arranged symmetrically about axis 162.

Figure 1B:
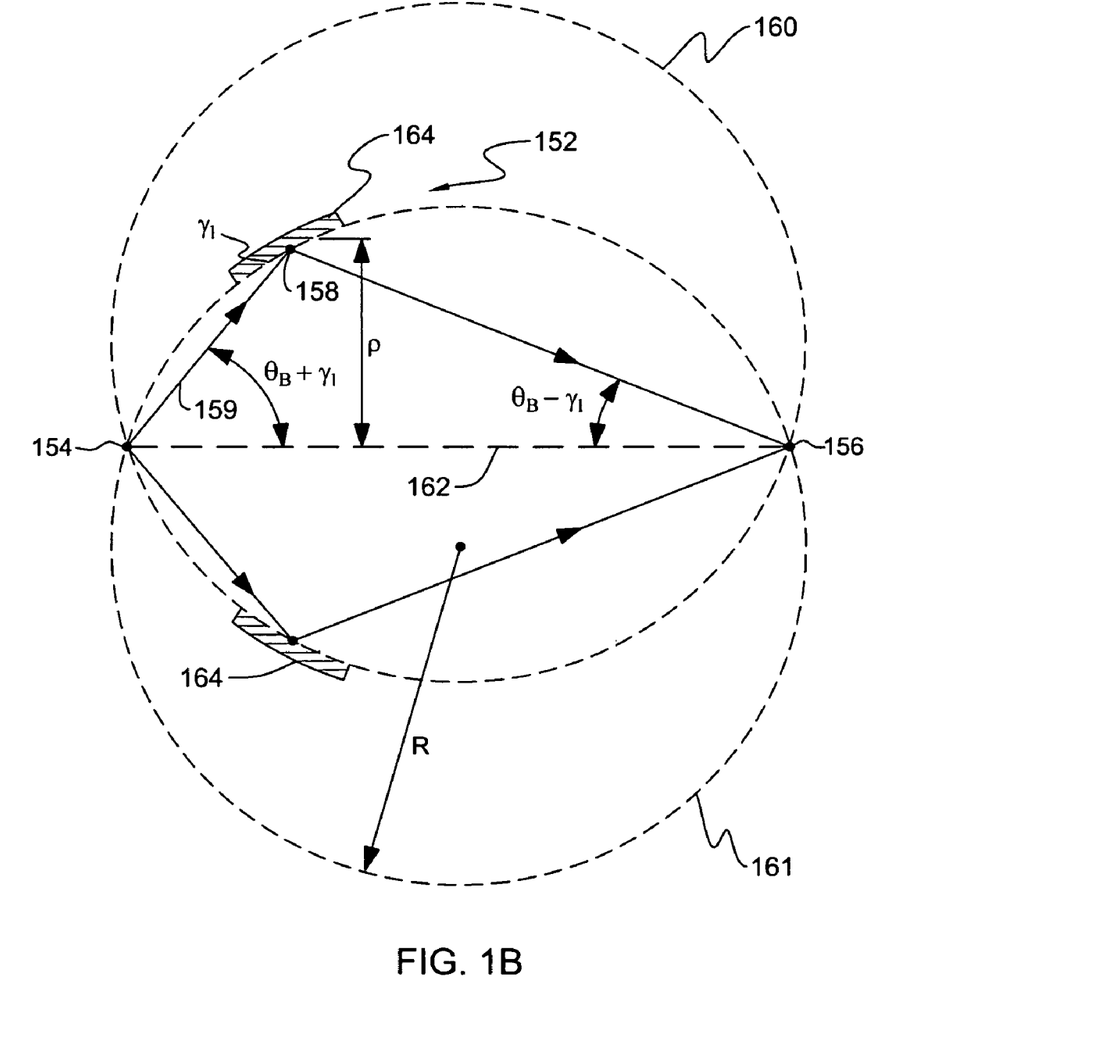
Figure 2:
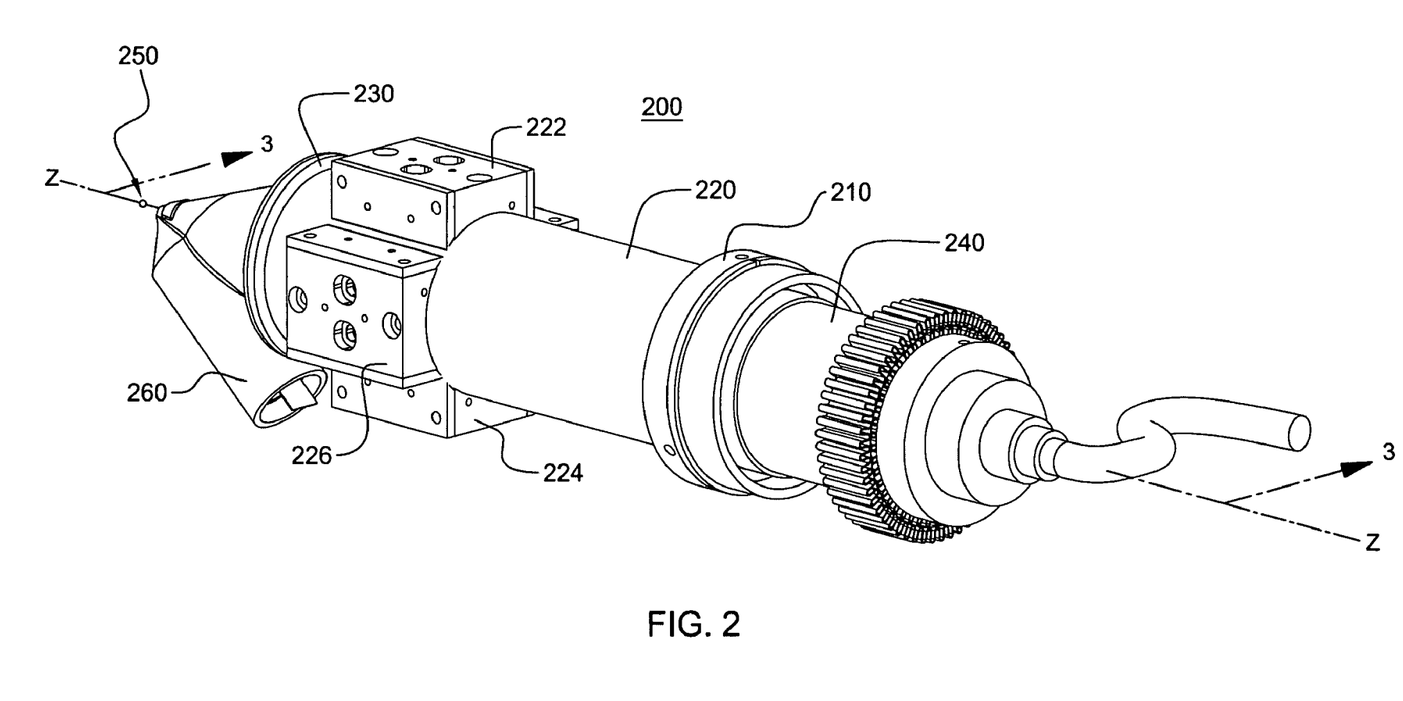
FIG. 2 is a perspective view of an aligned x-ray optic and source assembly, in accordance with one aspect of the present invention.
Figure 3:
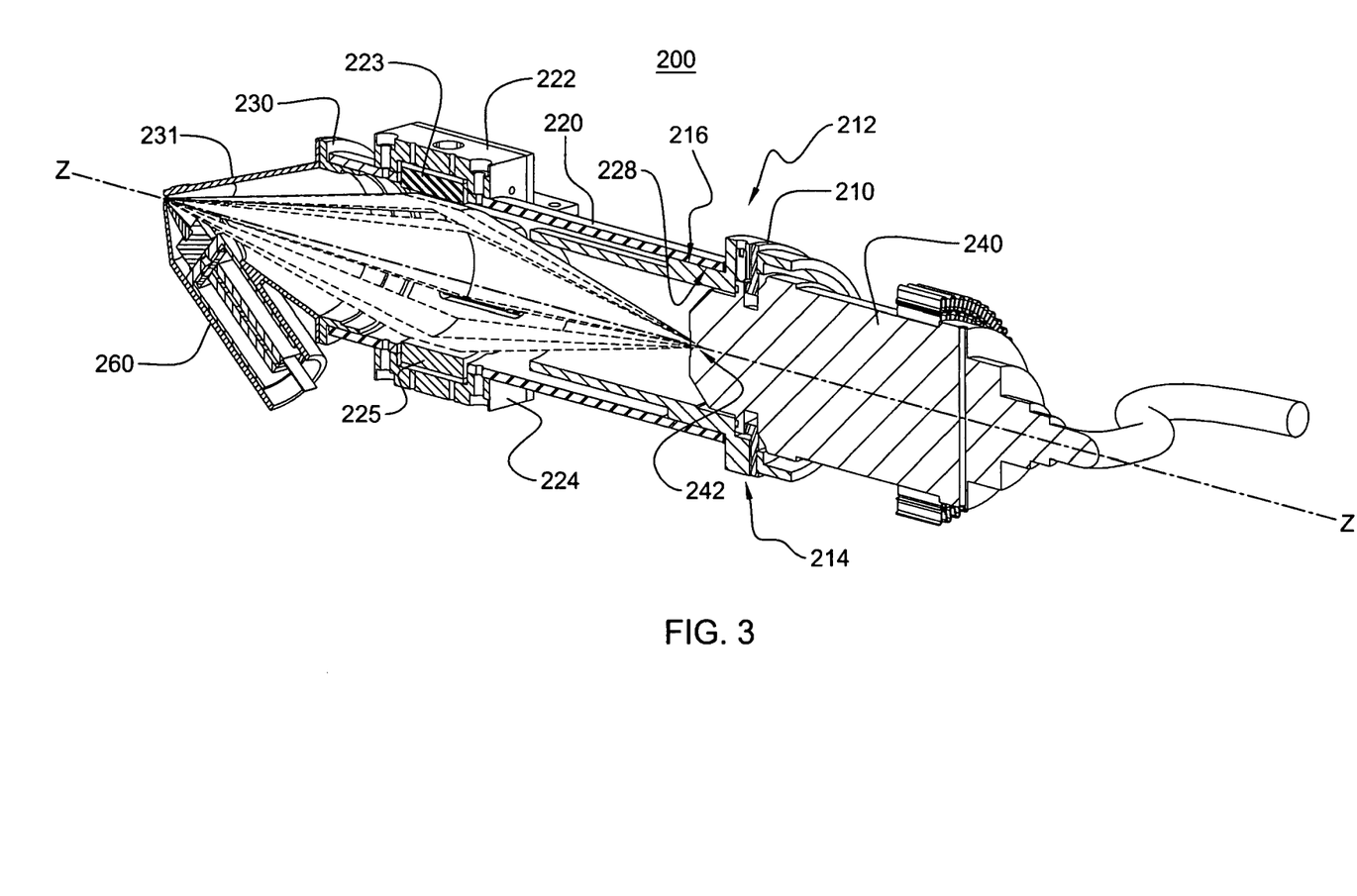
FIG. 3 is a sectional view of the assembly of FIG. 2.

FIG. 1b is a cross-sectional view taken along section lines 1b-1b of FIG. 1a, wherein the surface of optic 152, x-ray source location 154, and x-ray target location 156 define one or more Rowland (or focal) circles 160 and 161 of radius R for optic 152. Those skilled in the art will recognize that the number and orientation of the Rowland circles associated with crystal optic 152, or individual crystals 164, will vary with the position of the surface of optic crystal 152, for example, the variation of the toroidal position on optic crystal 152.

The internal atomic diffraction planes of optic crystal 152 also may not be parallel to its surface. For example, as shown in FIG. 1b, the atomic diffraction planes of crystal 152 make an angle $\gamma_1$ with the surface upon which x-rays are directed, at the point of tangency 158 of the surface and its corresponding optic circle 160 or 161. $\theta_B$ is the Bragg angle for crystal optic 152 which determines its diffractive effect. Each individual optic crystal can in one example be fabricated according to the method disclosed in commonly assigned U.S. Pat. No. 6,285,506, entitled "Curved Optical Device and Method of Fabrication," incorporated herein by reference in its entirety.

All individual crystals 164 should be aligned to the source-to-target axis 162, for proper Bragg conditions. Improvement in optic alignment, especially for such multiple-crystal optics, therefore remains an important area of interest.

Another issue, which particularly affects volume manufacturing, is the need to align disparate components which may be purchased from different vendors. For example, the x-ray tubes, when purchased in quantities from a vendor, may have source x-ray spots which are not consistently centered relative to their own housings. Re-centering these x-ray tube spots is necessary, as an initial step in the alignment process for an entire x-ray source assembly.

Various optic/source combinations have already been proposed to handle thermal stability, beam stability, and alignment issues, such as those disclosed in commonly assigned U.S. Pat. Nos. 7,110,506; 7,209,545; and 7,257,193. Each of these patents is also incorporated herein by reference in its entirety. In particular, U.S. Pat. No. 7,209,545 (entitled "X-Ray Source Assembly Having Enhanced Output Stability, and Fluid Stream Analysis Applications Thereof") and U.S. Pat. No. 7,257,193 (entitled "X-Ray Source Assembly Having Enhanced Output Stability Using Tube Power Adjustments and Remote Calibration") address certain tube/optic alignment problems during source operation with real-time, corrective feedback approaches for alignment between the tube focal spot, optic, and output focal spot. Sensors are used to detect various operating conditions, and mechanical and/or thermal adjustments are made to correct for instabilities, including misalignments. These types of systems are necessary and valuable for certain applications, but can also increase the cost and complexity of fielded systems.

Tube-optic-target alignment therefore remains an important design criteria, especially for small source, lower cost, volume-manufactured "in the field" systems requiring precise alignment, ideally accomplished at the factory with no further need to re-align in the field.

SUMMARY OF THE INVENTION

The shortcomings of the prior art are overcome and additional advantages are provided by the present invention, which in one aspect is an x-ray analysis apparatus for illuminating a sample spot with an x-ray beam. An x-ray tube is provided having a source spot from which a diverging x-ray beam is produced, the source spot requiring alignment along a transmission axis passing through the sample spot. A first housing section is provided, to which the x-ray tube is attached along a first axis thereof, the first housing section including mounting features for adjustably mounting the x-ray tube therein such that the source spot coincides with the first axis.

A second housing section includes a second axis coinciding with the transmission axis, and mating surfaces aligned to the second axis; and at least one x-ray optic attached to the second housing section for receiving the diverging x-ray beam and directing the beam toward the sample spot, the at least one x-ray optic requiring alignment along the transmission axis.

The first housing section and second housing section are matable along respective mating surfaces to thereby align the first and second axes with the transmission axis Z, thereby aligning the source spot, x-ray optic, and sample spot.

The first and/or second housing sections may be tubular in shape, in which case the mating surfaces of the first and second housing sections comprise surface portions in contact with each other upon attachment of the first and second tubular housing sections. The x-ray tube may also be tubular in shape, having its source spot at one end thereof.

The x-ray optic can be a curved diffracting optic or polycapillary optic, for receiving the diverging x-ray beam from the x-ray tube and focusing the beam at the sample spot, mounted along a surface of the second housing section, and separated from the second axis. At least one carriage may be provided for mounting the x-ray optic within the second housing section to receive the diverging x-ray beam, the carriage mountable either directly or indirectly to the second housing section, such that an active surface of the at least one x-ray optic is aligned along, and positioned a desired distance from, the transmission axis. An outer surface of the second housing section to which the at least one carriage is mounted may be fabricated such that the at least one x-ray optic is positioned the desired distance from the transmission axis. The carriage may also include mounting features, and/or a shim to position the optic a desired distance from the transmission axis.

A third housing section may include an aperture along the transmission axis through which the x-ray beam passes when illuminating the sample spot, the second housing section and third housing section being matable along respective mating surfaces to thereby align the aperture with the transmission axis and therefore the sample spot. An x-ray detector may be rigidly mounted to the third housing section, also in alignment with the transmission axis and therefore the sample spot.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in combination with the accompanying drawings in which:

BEST MODE FOR CARRYING OUT THE INVENTION

In accordance with the present invention, FIGS. 2-6 depict in various views (using like numerals to refer to like elements) a highly-aligned x-ray optic and source assembly 200. The assembly includes a first section 210, second section 220, and third section 230, which together align an x-ray tube 240 to a sample spot 250, along a central transmission axis Z. Also aligned along this axis are multiple optic carriage assemblies 222, 224, 226 which hold exemplary monochromating optics also requiring alignment to transmission axis Z (as discussed above with respect to FIGS. 1a-b).

First housing section 210 may include adjustable tube-mounting features 212, 214 about its perimeter for adjustably mounting tube 240 thereby ensuring centering of tube x-ray spot 242 centrally along a central axis of section 210 (not shown). As discussed below, further attachment of assembly sections 210, 220, and 230 will ensure that each respective section's axis (not shown) is ultimately aligned to the transmission axis Z. Therefore, the present invention allows for incremental alignment of potentially disparate components along the central transmission axis Z. For x-ray tube 240, they may be shipped with slightly off-center tube spots from the manufacturer, and therefore are required to be re-centered along section 210's axis using adjustable mounting features 212 and 214 (e.g., set screws).

The ability to provide an efficient, economical, portable analysis capability depends to a large extent upon x-ray tube and optic technology. In that regard, certain tube and optic technology can be combined for smaller, portable systems, e.g., a compact, electron-bombardment x-ray tube. One example of this type of x-ray tube is available from Oxford Instruments—model # 5011, which operates at less than 100 watts (i.e., 75 watts) at a cost of less than $1500 per tube, in contrast to higher-power, laboratory sources which can cost many thousands, or hundreds of thousands of dollars—which is cost prohibitive for many applications. Another example is the Varian VF-50J (similar to that depicted here), tubular in shape, and which operates at 50 watts or less, at a cost of several thousand dollars each.

In accordance with the present invention, second housing section 220 includes additional alignment features. First, complimentary mating surfaces 216 and 228 (FIG. 4) are provided to align the axes of sections 210 and 220 upon assembly, i.e., upon insertion of tube section 210 into section 220. Sections 210 and 220 are separately fabricated to guarantee alignment along their axes, and therefore to the central axis Z, when the mating surfaces are in contact.

Figure 4:
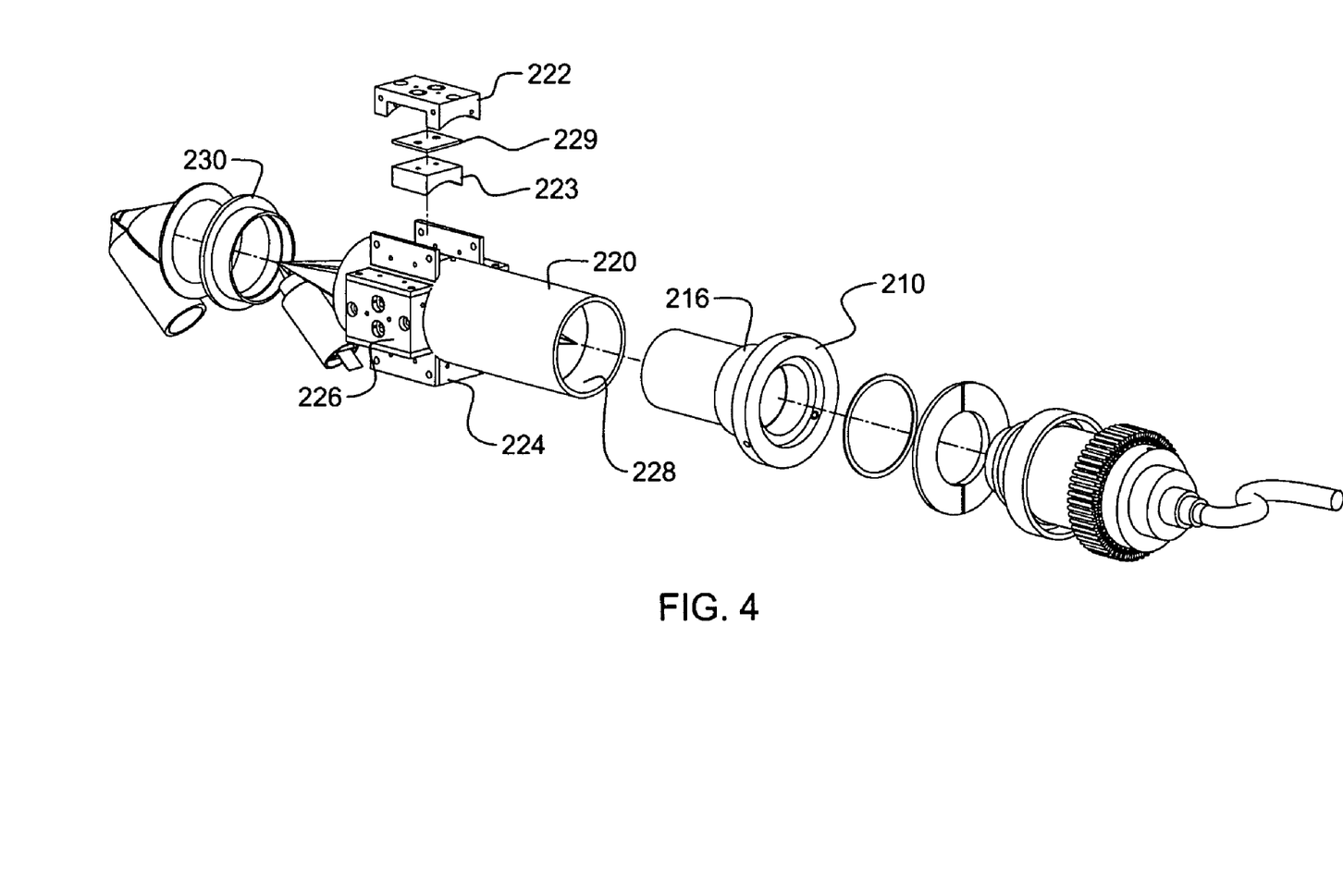
FIG. 4 is an exploded view of the assembly of FIG. 2.

Sections 210, 220, and 230 are shown in a form of tubular shape. Specifically, the sections are shown in the approximate form of a cylinder, with a circular cross-section, which is one type of tubular shape. The cross-section of tubular sections 210 and 220 could also be square, rectangular, etc. The tubular shapes shown, with circular cross-sections, provide a section-section alignment technique using outer perimeter mating surface 216 of section 210 and inner perimeter mating surface 218 of section 220. The fully enclosed tubular sections also provide required x-ray shielding.

Second, section 220 also accommodates the attachment of optic carriages 222, 224, and 226, which are fabricated to adjustably mount and align x-ray optics 223, 225, and 227 (not shown but implied within carriage 226) respectively, to section 220 and, ultimately, to transmission axis Z. X-ray beam focusing and/or monochromating can be accomplished using certain focusing and/or collimating optics, for example, curved crystal monochromating optics such as those disclosed in commonly assigned U.S. Pat. Nos. 6,285,506; 6,317,483; and 7,035,374; and/or multilayer optics; and/or polycapillary optics such as those disclosed in commonly assigned U.S. Pat. Nos. 5,192,869; 5,175,755; 5,497,008; 5,745,547; 5,570,408; and 5,604,353. Each of the above-noted patents is incorporated herein by reference in its entirety. Of particular interest are curved monochromating optics (discussed above with reference to FIGS. 1a-b), which require precise alignment along, and a certain distance from, the transmission axis to meet the appropriate Bragg conditions of interest. Also of particular interest is the requirement to align multiple such optics (e.g., 223, 225, 227) along a single axis Z.

Figure 5:
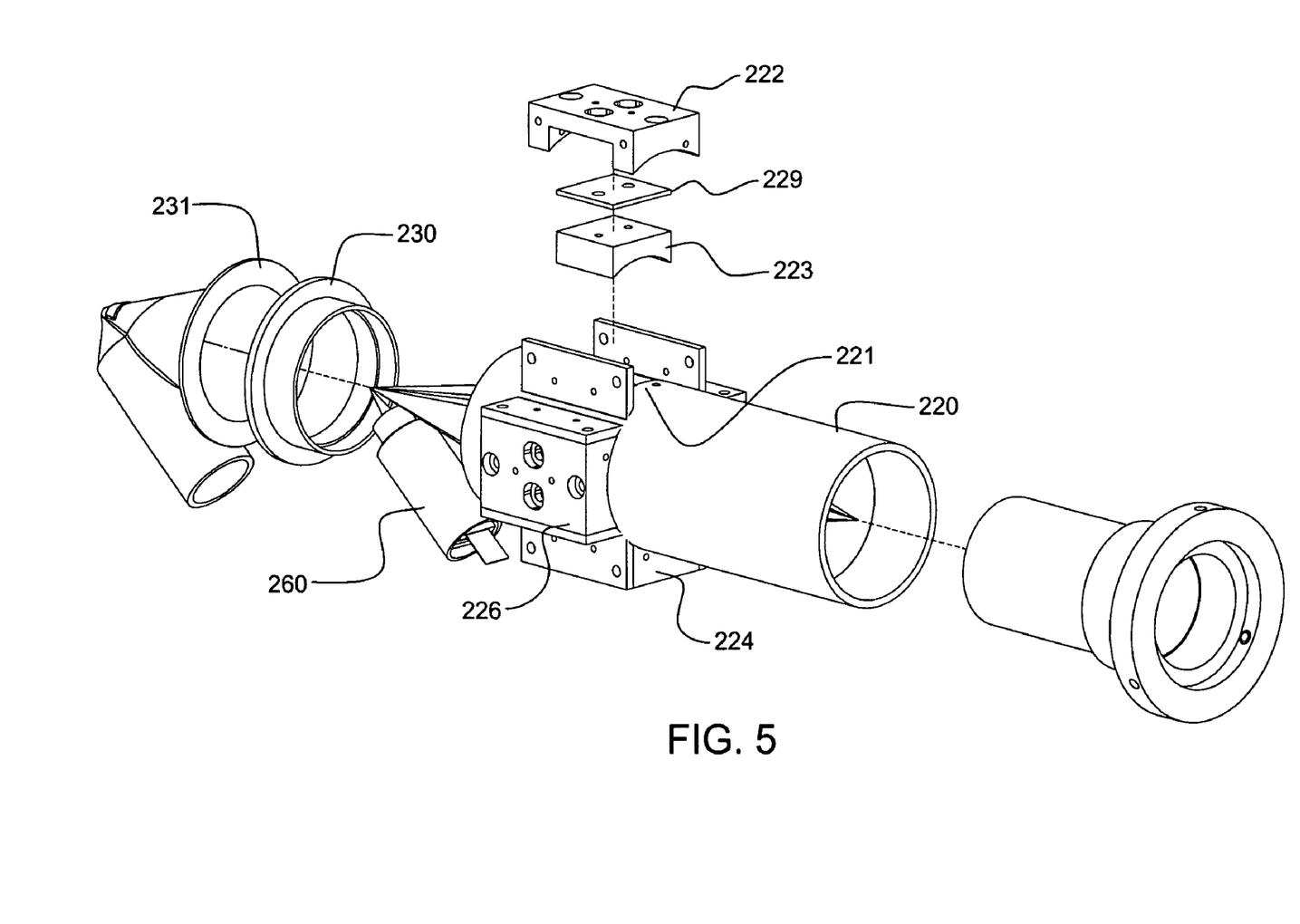
FIG. 5 is a partial, exploded view of the assembly of FIG. 2 emphasizing the optic portion thereof.
Figure 6:
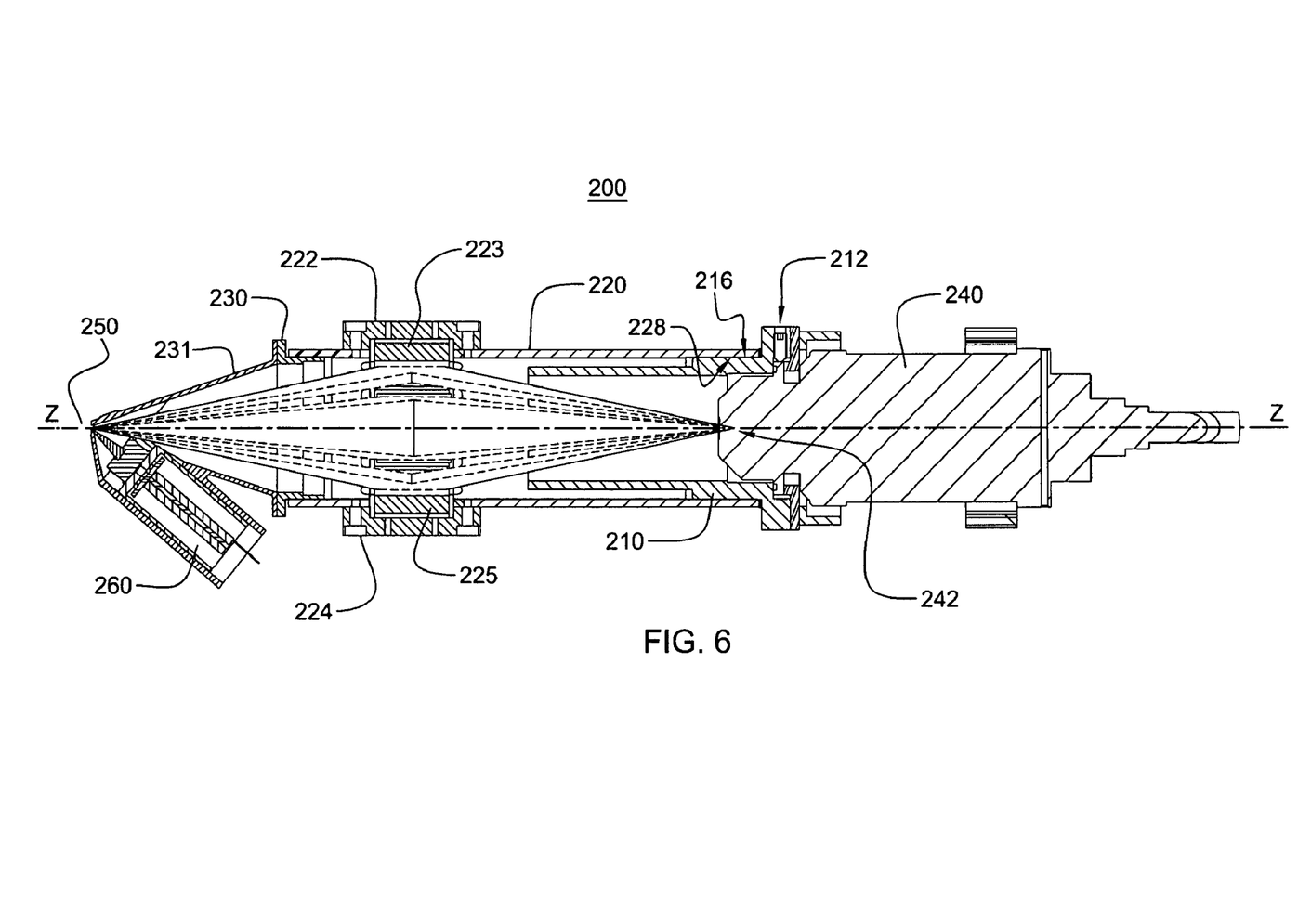
FIG. 6 is another partial, sectional view of the assembly of FIG. 2.

The exemplary curved crystal optics 223, 225, and 227 within the second housing section receive the diverging x-ray beam from x-ray tube spot 242, and focus diffracted beam(s) to sample spot 250. The carriages 222, 224, and 226 are mountable either directly or indirectly to the second housing section, such that an active surface of the optic is aligned along, and positioned a desired distance from, the transmission axis Z. The outer surface area (e.g., outer diameter) of the second housing section to which the carriage is mounted can be appropriately sized (e.g., by outer radius) and fabricated such that the at least one x-ray optic is positioned the desired distance from the transmission axis. Moreover, a shim 229, and/or other spacing adjusters (set screws, etc) can be employed to ensure proper optic alignment (FIGS. 4-5). Notably, these types of optics, to maintain their Bragg condition conditions, may be mounted along a surface of the second housing section, while separated from the transmission axis Z.

Third housing section 230 includes an aperture at its point, which requires alignment to transmission axis Z for proper illumination of sample spot 250 with the focused x-ray beam(s) from the optic(s). A cone 231 within this section may also be included for additional shielding, rigidly or adjustably mounted to section 230. Section 230 may also have rigidly mounted thereon an exemplary energy-dispersive detector 260 which itself requires close alignment to transmission axis Z. To effect alignment of section 230 with sections 220 and 210 (thereby completing alignment of the entire source assembly along transmission axis Z), complimentary mating surfaces and/or adjustable mounting means (e.g., set screws) can be employed to align housing section 230 to section 220 and therefore to section 210. Section 230 and/or cone 231 can also be adjusted in directions orthogonal to the transmission axis Z. Other types of detectors (e.g., wavelength dispersive) may also be used with or without similar optics in the detection path. Additional issues should be considered regarding detector alignment. Energy dispersive detector 260 may also have its own focal spot in space, which also requires alignment to beam/sample focal spot 250 (e.g., FIG. 6). (Sample spot 250 may be at the surface, or below the surface, of the sample; depending on the focal point of the x-ray beam.) As shown, detector is mounted to cone 31, which may have adjustable mounting means (shims, set screws, etc.), as well as a predetermined mating surface, which ensure alignment of the detector. Using this approach, end-to-end alignment of the x-ray tube, optic(s), sample spot, and detector is provided.

Additional shims can be placed between each section (210, 22, 230) to control their respective spacings and therefore their longitudinal placement along transmission axis Z.

The present invention provides a highly aligned x-ray optic and source assembly using various techniques to ensure alignment of disparate components (optics, x-ray tubes, detectors, etc) in a small, rugged, portable, analyzer for in-situ, on-line, measurements in industrial process, clinical, and field settings. Volume manufacturing is enabled, even when components of varying dimensional tolerances are introduced into the production. Moreover, the highly aligned assembly provides the precision alignment required by focusing, diffractive optics according to Bragg conditions. Any misalignment of the optics will directly impact the precision of the device.

The trend toward increasing global regulation of toxins presents an opportunity for such highly aligned systems as a platform technology to address a number of currently important applications. The disclosed system provides several advantages over previous toxin detection technologies with the combined ability to non-destructively detect very low levels, isolate small features, and give reliable results across a wide range of toxic elements. Conventional XRF analyzers and more standard analytical chemistry techniques do not possess the needed combination of reliable results, some level of portability, and low cost per test needed in today's tightening regulatory environment. Areas that are in need of these attributes include consumer products, electronics, air quality monitoring, body fluids, food products, and pharmaceuticals. Many of these applications can, in principle, share a common hardware and software platform, to hasten new product introductions, lower manufacturing costs, and provide higher volumes of precision instruments.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An x-ray analysis apparatus for illuminating a sample spot with an x-ray beam, comprising:
    an x-ray tube having a source spot from which a diverging x-ray beam is produced, the source spot requiring alignment along a transmission axis passing through the sample spot;
    a first housing section to which the x-ray tube is attached along a first axis thereof, the first housing section including adjustable mounting features for adjustably mounting the x-ray tube therein such that the source spot coincides with the first axis, the first housing section further including mating surfaces aligned to the first axis;
    a second housing section having a second axis coinciding with the transmission axis, and mating surfaces aligned to the second axis; and
    at least one x-ray optic attached to the second housing section for receiving the diverging x-ray beam and directing the beam toward the sample spot, the at least one x-ray optic requiring alignment along the transmission axis;
    the first housing section and second housing section being matable along their respective mating surfaces to thereby align the first and second axes with the transmission axis, thereby aligning the source spot, x-ray optic, and sample spot.

2. The apparatus of claim 1, wherein the second housing section is tubular in shape, with the second axis running longitudinally therein.

3. The apparatus of claim 2, wherein the x-ray tube is tubular in shape, having its source spot at one end thereof.

4. The apparatus of claim 2, wherein the first and second housing sections are tubular in shape, and the mating surfaces of the first and second housing sections comprise surface portions in contact with each other upon attachment of the first and second tubular housing sections.

5. The apparatus of claim 4, wherein the x-ray tube is tubular in shape, having its source spot at one end thereof.

6. The apparatus of claim 1, wherein the at least one x-ray optic is at least one curved diffracting optic or polycapillary optic, for receiving the diverging x-ray beam from the x-ray tube and focusing the beam at the sample spot.

7. The apparatus of claim 6, wherein the at least one optic is at least one focusing monochromating optic.

8. The apparatus of claim 7, wherein the at least one focusing monochromatic optic is a doubly curved crystal optic or doubly curved multi-layer optic, mounted along a surface of the second housing section, and separated from the second axis.

9. The apparatus of claim 1, wherein the at least one x-ray optic comprises a plurality of x-ray optics, each optic of the plurality of optics attached to the second housing section for receiving the diverging x-ray beam and directing a respective portion of the beam toward the sample spot, and requiring alignment along the transmission axis, mounted along a surface of the second housing section, and separated from the transmission axis.

10. The apparatus of claim 9, wherein each optic of the plurality of x-ray optics is a focusing monochromatic optic.

11. The apparatus of claim 10, wherein each optic of the plurality of x-ray optics is a doubly curved crystal optic or doubly curved multi-layer optic, mounted along a surface of the second housing section, and separated from the second axis.

12. The apparatus of claim 1, further comprising at least one carriage for mounting the at least one x-ray optic to the second housing section to receive the diverging x-ray beam, the at least one carriage mountable either directly or indirectly to the second housing section, such that an active surface of the at least one x-ray optic is aligned along, and positioned a desired distance from, the transmission axis.

13. The apparatus of claim 12, wherein a surface of the second housing section to which the at least one carriage is mounted is fabricated such that the at least one x-ray optic is positioned the desired distance from the transmission axis.

14. The apparatus of claim 13, wherein the second housing section is tubular in shape, and wherein the surface of the second housing section to which the at least one carriage is mounted comprises and outer diameter of the second housing section.

15. The apparatus of claim 12, wherein the carriage comprises mounting features, and/or a shim to position the optic a desired distance from the transmission axis.

16. The apparatus of claim 1, further comprising a third housing section, the third housing section including an aperture along the transmission axis through which the x-ray beam passes when illuminating the sample spot, the second housing section and third housing section being matable along respective mating surfaces to thereby align the aperture with the transmission axis and therefore the sample spot.

17. The apparatus of claim 16, further comprising an x-ray detector mounted to the third housing section in alignment with the sample spot.

18. An x-ray analysis apparatus for illuminating a sample spot with an x-ray beam, comprising:
   an x-ray tube having a source spot from which a diverging x-ray beam is produced, the source spot requiring alignment along a transmission axis passing through the sample spot;
   a first tubular housing section to which the x-ray tube is attached along a first axis thereof, such that the source spot coincides with the first axis, the first housing section further including mating surfaces aligned to the first axis;
   a second tubular housing section having a second axis coinciding with the transmission axis, and mating surfaces aligned to the second axis; and
   at least one focusing x-ray optic attached to the second housing section for receiving the diverging x-ray beam and directing the beam toward the sample spot, the at least one x-ray optic requiring alignment along the transmission axis;
   the first housing section and second housing section being matable along their respective mating surfaces to thereby align the first and second axes with the transmission axis, thereby aligning the source spot, x-ray optic, and sample spot.

19. The apparatus of claim 18, wherein the at least one focusing x-ray optic is at least one curved diffracting optic or polycapillary optic, for receiving the diverging x-ray beam from the x-ray tube and focusing the beam at the sample spot.

20. The apparatus of claim 19, wherein the at least one optic is at least one focusing monochromating optic.

21. The apparatus of claim 20, wherein the at least one focusing monochromatic optic is a doubly curved crystal optic or doubly curved multi-layer optic, mounted along a surface of the second housing section, and separated from the second axis.

22. The apparatus of claim 18, wherein the at least focusing one x-ray optic comprises a plurality of focusing x-ray optics, each optic of the plurality of optics attached to the second housing section for receiving the diverging x-ray beam and directing a respective portion of the beam toward the sample spot, and requiring alignment along the transmission axis, mounted along a surface of the second housing section, and separated from the transmission axis.

23. The apparatus of claim 18, further comprising a third housing section, the third housing section including an aperture along the transmission axis through which the x-ray beam passes when illuminating the sample spot, the second housing section and third housing section being matable along respective mating surfaces to thereby align the aperture with the transmission axis and therefore the sample spot.

* * * * *